(12) United States Patent
Balasubramanian et al.

(10) Patent No.: US 10,368,235 B1
(45) Date of Patent: Jul. 30, 2019

(54) WIRELESS DEVICE SIM ACTIVATION WHILE ROAMING

(71) Applicant: Apple Inc., Cupertino, CA (US)

(72) Inventors: Sundarraman Balasubramanian, Nanterre Ville (FR); Vijay Venkataraman, San Jose, CA (US); Omar Ali, Houilles (FR); Masood Maqbool, Le Pecq (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/927,406

(22) Filed: Mar. 21, 2018

Related U.S. Application Data

(60) Provisional application No. 62/617,143, filed on Jan. 12, 2018.

(51) Int. Cl.
| | |
|---|---|
| *H04W 4/60* | (2018.01) |
| *H04W 8/18* | (2009.01) |
| *H04W 8/24* | (2009.01) |
| *H04W 8/26* | (2009.01) |
| *H04L 29/06* | (2006.01) |

(52) U.S. Cl.
CPC ........... *H04W 8/24* (2013.01); *H04W 8/183* (2013.01); *H04W 8/265* (2013.01); *H04L 63/0853* (2013.01); *H04W 4/60* (2018.02)

(58) Field of Classification Search
CPC ..... H04W 8/183; H04W 12/06; H04W 48/18; H04W 4/24; H04W 4/50; H04W 88/06
See application file for complete search history.

(56) References Cited

U.S. PATENT DOCUMENTS

| | | | | |
|---|---|---|---|---|
| 8,073,441 | B1* | 12/2011 | Unger .................. | H04W 48/18 455/404.2 |
| 9,332,414 | B2* | 5/2016 | Fan ....................... | H04M 15/00 |
| 2006/0205434 | A1* | 9/2006 | Tom ...................... | H04W 8/26 455/558 |
| 2009/0239530 | A1* | 9/2009 | Luo ...................... | H04W 48/18 455/432.1 |
| 2011/0306318 | A1* | 12/2011 | Rodgers ................ | H04W 8/183 455/410 |
| 2012/0243467 | A1* | 9/2012 | Vallurupalli ......... | H04W 48/18 370/328 |
| 2013/0217361 | A1* | 8/2013 | Mohammed ......... | H04W 12/06 455/411 |

(Continued)

*Primary Examiner* — Dung Hong
(74) *Attorney, Agent, or Firm* — Dickinson Wright RLLP (57) ABSTRACT

Activation or update of a subscriber identity module (SIM) via a roaming cellular wireless network by a mobile device includes the mobile device: determining a country of origin associated with a mobile network operator (MNO) for the SIM, determining a current geographic location of the mobile device, and when the current geographic location of the mobile device does not correspond to the country of origin for the MNO associated with the SIM of the eUICC, presenting an option to activate or update the SIM over a local roaming cellular wireless network. When the option is accepted, the mobile device enables a cellular data roaming capability for the mobile device, activates or updates the SIM via the local roaming cellular wireless network, and, after the SIM is activated or updated, disables the cellular data roaming capability for the mobile device.

20 Claims, 6 Drawing Sheets

(56) References Cited

U.S. PATENT DOCUMENTS

| | | | | |
|---|---|---|---|---|
| 2013/0331096 A1* | 12/2013 | Rogan | ............... | H04W 8/12 |
| | | | | 455/433 |
| 2014/0024332 A1* | 1/2014 | Droste | ............ | H04L 12/1895 |
| | | | | 455/404.2 |
| 2015/0099483 A1* | 4/2015 | Vetaal | ............ | H04M 15/83 |
| | | | | 455/405 |
| 2015/0126187 A1* | 5/2015 | Ponukumati | ...... | H04W 72/02 |
| | | | | 455/434 |
| 2016/0157085 A1* | 6/2016 | Yeoum | ............ | H04M 3/387 |
| | | | | 455/435.1 |
| 2016/0246611 A1* | 8/2016 | Li | ............ | H04W 12/08 |
| 2016/0262004 A1* | 9/2016 | Telang | ............ | H04W 8/02 |
| 2017/0127270 A1* | 5/2017 | Hao | ............ | H04W 8/08 |
| 2017/0245135 A1* | 8/2017 | Park | ............ | H04W 8/06 |
| 2017/0347259 A1* | 11/2017 | Kwak | ............ | H04W 8/205 |

* cited by examiner

WIRELESS DEVICE SIM ACTIVATION WHILE ROAMING

CROSS-REFERENCE TO RELATED APPLICATIONS

The present application claims the benefit of U.S. Provisional Application No. 62/617,143, entitled "WIRELESS DEVICE SIM ACTIVATION WHILE ROAMING," filed Jan. 12, 2018, which is incorporated by reference herein in its entirety for all purposes.

FIELD

The described embodiments relate generally to wireless communication, including activation and/or updating of a subscriber identity module (SIM) of a wireless device via a roaming cellular wireless network.

BACKGROUND

Advances in wireless communication technologies have resulted in an exponential increase in the demand for improved computing devices, consumer services, and communication bandwidth. To accommodate this growing demand, device manufacturers, service providers, and various intermediary entities, have worked to simplify network access control. Generally, network access control involves a subscriber attempting to gain access to a network service(s) by providing credentials to an authenticating network service provider for verification. In a scenario where the network service provider successfully verifies/authenticates the access identity of the subscriber based on the credentials provided, a corresponding level-of-access to network service(s) is granted for the subscriber.

Many global telecommunication service providers issue subscriber identity module (SIM) cards to their subscribers (or potential subscribers) to allow individual subscribers to insert the physical SIM card within their user equipment (UE) device(s) for the purpose of gaining access to the provider's network services, in accordance with a subscriber's service level agreement (SLA). A SIM (which may also be referred to as a USIM, ISIM, CSIM, etc. for different radio access technologies) is a component application of a universal integrated circuit card (UICC) "smart card," where the SIM and UICC can be referred to together as a SIM card. In function, the SIM component securely stores an international mobile subscriber identity (IMSI), along with various cryptographic keys and other credentials, which can be used for network authentication.

The European Telecommunications Standards Institute (ETSI) and the Global System for Mobile Communications Association (GSMA) have been responsible for standardizing many hardware-based and software-based features, and improvements thereof, for SIM cards and devices. The GSMA proposed the use of an embedded UICC (eUICC) for cellular connectivity in various devices. While telecommunications service providers have tended to prefer the use of physical SIM cards for various practical reasons, including facilitating hot-swapping between different MNO SIM cards in a mobile device. Activation of an MNO SIM card usually occurs via a secure data connection through the MNO's cellular wireless network; however, when the mobile device in which the MNO SIM card is not located within range of the MNO's cellular wireless network, such as when roaming on a visited cellular wireless network, activation of the MNO SIM may be unavailable when cellular data roaming capability is disabled.

SUMMARY

This Summary is provided to introduce (in a simplified form) select concepts that are further described below in the Detailed Description. This Summary is not intended to identify key features of the claimed subject matter, nor is it intended to be used as an aid in determining the scope of the claimed subject matter.

Embodiments described herein provide for activation for a subscriber identity module (SIM) through a roaming cellular wireless network by a mobile device. During an activation process, the mobile device determines a country of origin associated with a mobile network operator (MNO) for a SIM of a universal integrated circuit card (UICC) inserted in the mobile device. The mobile device also determines a current geographic location of the mobile device, such as by use of a global positioning system (GPS) or by using another geographic location determining system, e.g., using signals received from wireless access points and/or cellular wireless network base stations. When the current geographic location of the mobile device corresponds to the country of origin for the MNO associated with the SIM of the UICC, the mobile device activates or updates the SIM of the UICC via the local cellular wireless network of the MNO, e.g., communicating through a secure data connection between the eUICC and a server of the MNO traversing the MNO's local cellular wireless network. When the current geographic location of the mobile device does not correspond to the country of origin for the MNO associated with the SIM of the eUICC, the mobile device presents an option to activate or update the SIM of the UICC over a local roaming cellular wireless network, which may incur roaming data costs. When the option to activate or update the SIM of the UICC over the local roaming cellular wireless network is accepted, the mobile device enables a cellular data roaming capability for the mobile device, which may be disabled by default, and activates or updates the SIM of the UICC via the local roaming cellular wireless network, e.g., communicating through a secure data connection between the eUICC and a server of the MNO traversing the local roaming cellular wireless network. After the SIM of the UICC is activated or updated, the mobile device disables the cellular data roaming capability for the mobile device. In some embodiments, options to activate or update the SIM of the UICC via a wireless local area network connection are also presented. In some embodiments, an electronic SIM (eSIM) of an embedded UICC (eUICC) is activated or updated similarly via a local roaming cellular wireless network.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments, and the attendant advantages thereof, may best be understood by referencing the corresponding description for the figures identified below, in conjunction with the illustrations in the accompanying drawings. The subject matter depicted in the drawings is included solely for illustrative purposes.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Mobile devices with cellular wireless network capabilities include credentials for authentication and authorization to access network services provided by a mobile network operator (MNO). The credentials can be included as part of a subscriber identity module (SIM), which can also referred to as a profile, on a universal integrated circuit card (UICC), or as part of an electronic SIM (eSIM) on an embedded UICC (eUICC). Prior to using the credentials of the SIM, the mobile device may be required to activate the SIM and/or to update profile data included in the SIM. When the mobile device, in which the SIM resides, is located within range of a cellular wireless network of the MNO associated with the SIM, the mobile device can establish a cellular data connection between the UICC that houses the SIM and a network-based server of the MNO in order to authenticate and/or authorize with the MNO for access to network services of the MNO available in accordance with properties of the SIM. Additionally, the SIM can be updated by downloading profile data from the server of the MNO through the cellular data connection. When the mobile device is not located within range of the cellular wireless network of the MNO associated with the SIM, the mobile device can provide an option, e.g., via a user interface of the mobile device, to activate (and/or update) the SIM via a cellular data connection through a roaming cellular wireless network. Responsive to an acceptance of the option to activate via the roaming cellular wireless network, the mobile device can enable a data roaming capability for the SIM, which may be disabled by default prior to activation and/or updating, and activate and/or update the SIM via the roaming cellular wireless network. Upon completion of the activation and/or updating, the mobile device can disable the data roaming capability for the SIM.

The mobile device can determine a region, e.g., a country of origin, for the MNO associated with the SIM and can compare the region to a current geographic location of the mobile device. The mobile device can determine the current geographic location of the mobile device by using a global positioning system (GPS) capability and/or by using information obtained from radio signals received from cellular base stations and/or from wireless local area network (WLAN) access points. Cellular base stations may include a mobile country code (MCC) and a mobile network code (MNC) in certain broadcast messages. Access points may also including identification information that may be used to determine a current geographic location in which the mobile device is operating. When the region for the MNO associated with the SIM corresponds to the current geographic location of the mobile device, a cellular data connection through a local (non-roaming) cellular wireless network can be established, if coverage for the MNO is locally available. When the region for the MNO associated with the SIM does not correspond to the current geographic location of the mobile device, a cellular data connection may only be available through a local roaming cellular wireless network. The SIM can include a pre-installed list of cellular wireless networks, e.g., a public land mobile network (PLMN) list, that includes information for detecting cellular wireless networks with which the SIM may allow the mobile device to establish a connection. Cellular data roaming may be disabled by default to avoid unexpected roaming charges for the user of the mobile device. The mobile device can provide the indication for an option to enable cellular data roaming temporarily for the purpose of activation and/or updating of the SIM. Activation and/or updating of a SIM can include updating carrier settings for the SIM, adding a new SIM, activating a newly purchased mobile device including an included and/or added SIM, resetting a mobile device, such as during a system wipe and new installation of an operating system, and/or repurposing a mobile device for a new user. Activation and/or updating of the SIM may be required in order for the mobile device to provide wireless services associated with the SIM. In some embodiments, the MNO may refrain from charging the user for activation or downloading of profile update data through the local roaming cellular wireless network.

These and other embodiments are discussed below with reference to FIGS. 1-6; however, those skilled in the art will readily appreciate that the detailed description given herein with respect to these figures is for explanatory purposes only and should not be construed as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Figure 1:
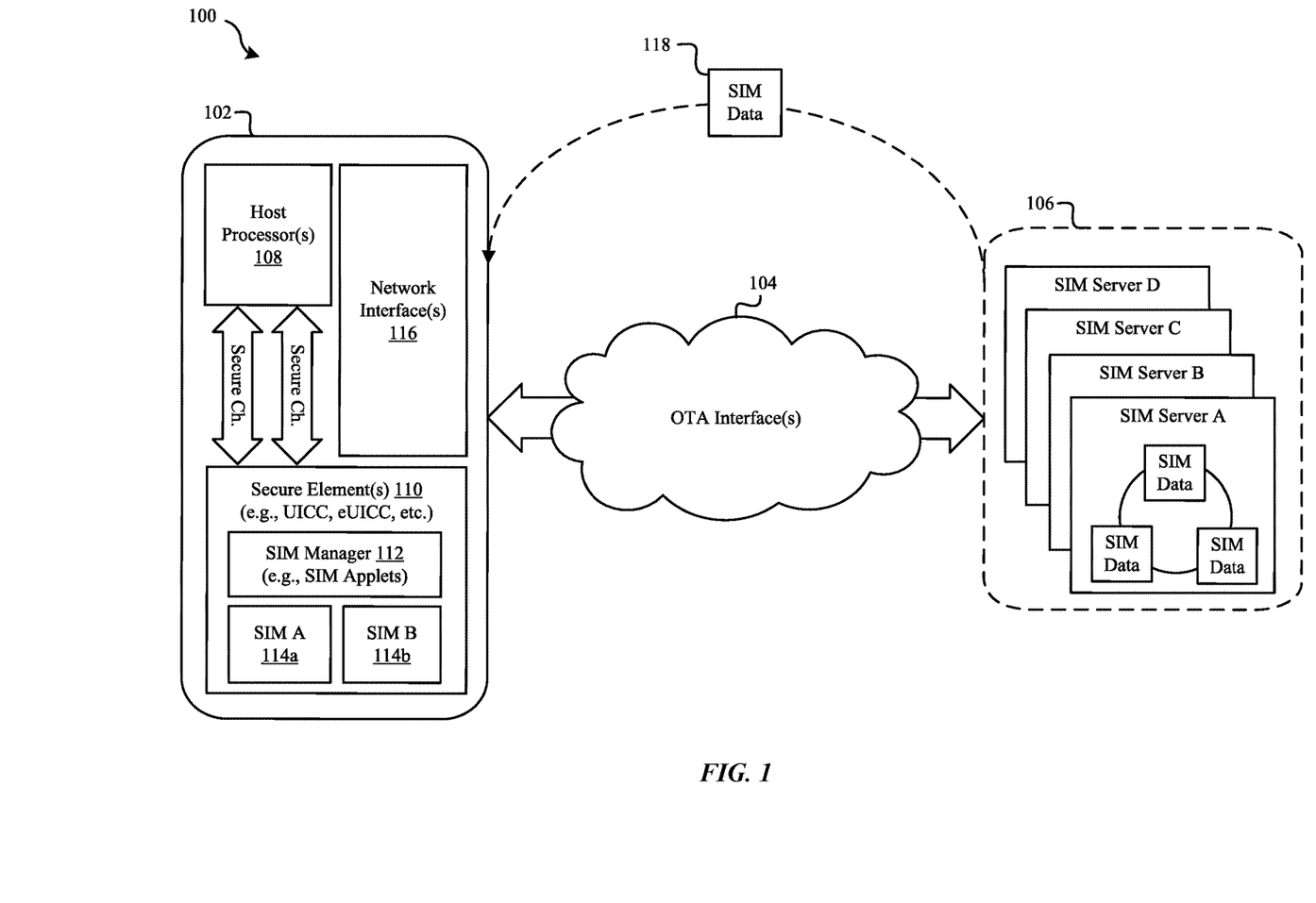
FIG. 1 illustrates a network diagram of an exemplary mobile device and multiple network-based SIM servers, in accordance with some embodiments.

FIG. 1 illustrates a network diagram 100 of an exemplary mobile device 102 and multiple network-based SIM servers 106, in accordance with some embodiments. The mobile device 102 can communicate with a network-based SIM server 106 through an over-the-air (OTA) interface 104. The mobile device 102 can include one or more network interfaces 116 that allows the mobile device to communication using any of one or more different cellular wireless network technologies, such as 3G, 4G, or 5G cellular, as well as different WLAN and/or wireless personal area network (WPAN) technologies, such as Wi-Fi or Bluetooth. In this regard, the OTA interface 104 can correspond to a wireless communication channel between the mobile device 102 and one or more SIM servers 106 through cellular wireless network base stations (not shown) and/or wireless access points (not shown).

The mobile device 102 can also include one or more host processor(s) 108 for processing resident application data and Internet Protocol (IP) data for communication with network interfaces 116 via the OTA interface(s) 104. Additionally, the mobile device 102 can include one or more secure elements 110 that, in various embodiments, may correspond to a removable UICC component and/or to an eUICC component. In various embodiments, the mobile device 102 can include any combination of UICC and eUICC components that each store one or more SIMs 114 and/or eSIMs. It should be understood that the secure element 110 may include secure processor and secure storage/memory components (not shown) that allow the secure element 110 to operate a SIM manager 112, e.g., one or more SIM applet application(s), to maintain/manage one or more SIMs 114a-b stored in the secure element 110. By way of example, in various embodiments, SIM server A of the SIM servers 106 may be associated with a first MNO, and SIM server B of the SIM servers 106 may be associated with a second MNO. Communication between a SIM server 106 and the secure element 110 can be through a secure channel between the host processor(s) 108 and the secure element 110. In accordance with various implementations, the secure channel can be cryptographically secure (using encryption) at the mobile device 102 to prevent unauthorized access to any SIM data within the mobile device 102. Likewise, the secure element 110 can be cryptographically secure (using encryption) at the mobile device 102 to prevent access to any data within the secure element 110 by any on-device or remote hardware and/or software entities. A SIM 114 of the secure element 110 of the mobile device 102 can be activated by a corresponding SIM server 106 to enable the mobile device 102 to access services of a corresponding MNO through a cellular wireless network. Updating of a SIM 114 of the secure element 110 can also occur through a secure encrypted data connection over an OTA interface 104 with a corresponding SIM server 106, such as by downloading applicable SIM data 118 required for updating the SIM 114. Normally, updating can occur via a cellular data connection between the mobile device 102 and the corresponding SIM server 106 through a cellular wireless network associated with the MNO of the SIM 114; however, in some circumstances a data roaming capability for the mobile device 102 can be disabled by default, such as upon initial activation of the mobile device 102, following a system wipe and new installation, and/or when initially activating a SIM 114 for a newly installed secure element 110. When the mobile device is roaming, e.g., located in a geographic area that does not correspond to a geographic region for the MNO of the SIM 114 to be activated, a data connection via a roaming cellular wireless network, e.g., to activate or update the SIM 114, can be required.

Figure 2:
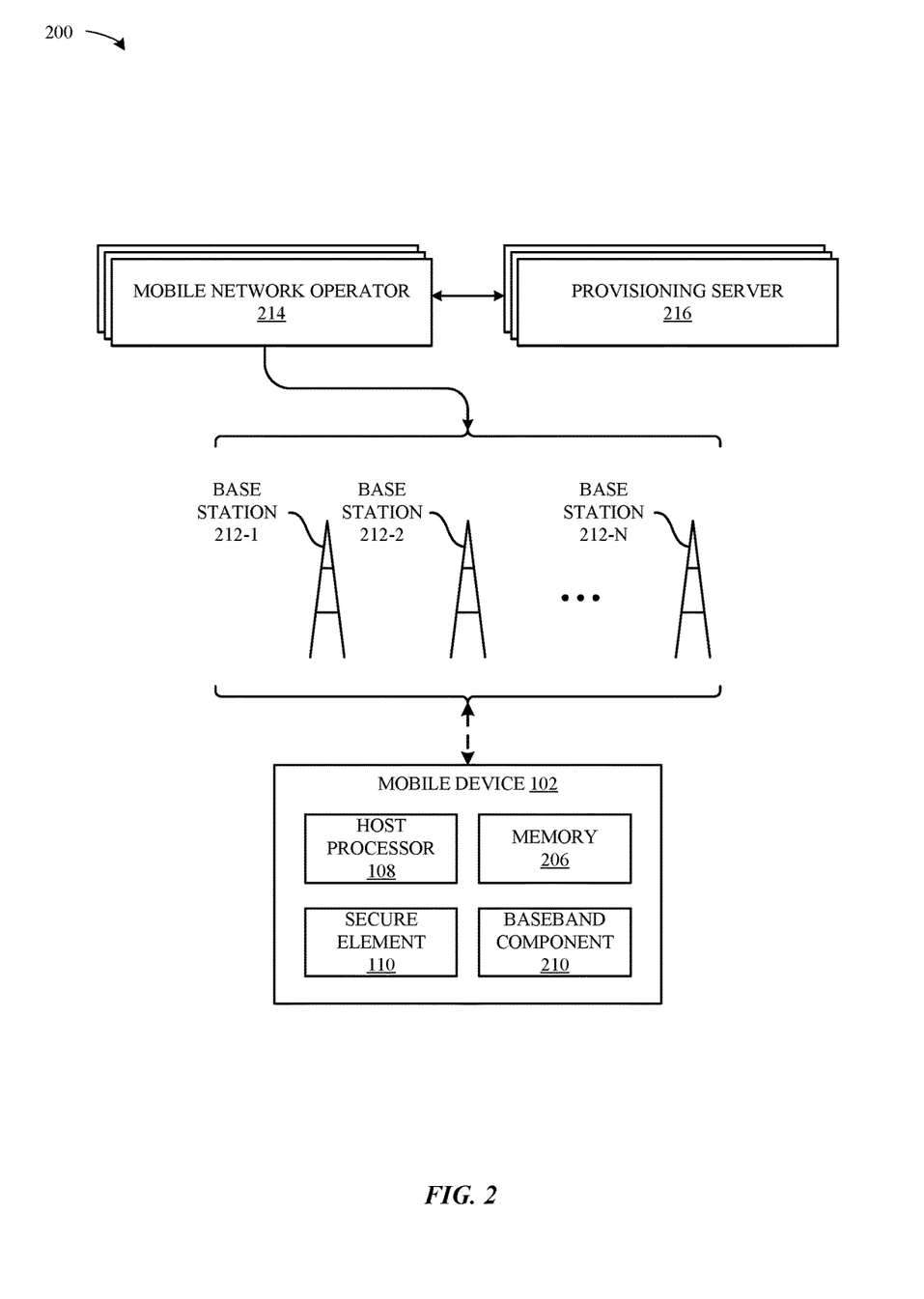
FIG. 2 illustrates a block diagram of different components of an exemplary system configured to implement various techniques described herein, in accordance with some embodiments.

FIG. 2 illustrates a block diagram 200 of different components of an exemplary system configured to implement various techniques described herein, in accordance with some embodiments. FIG. 2 illustrates a high-level overview of a system, which, as shown, includes a mobile device 102, a group of base stations 212 that are managed by different MNOs 214, and a set of provisioning servers 216 that are in communication with the MNOs 214. The provisioning servers 216 can correspond to the network-based SIM servers 106 of FIG. 1. The base stations 212 can represent different radio towers that are configured to communicate with the mobile device 102, and the MNOs 214 can represent different wireless service providers that provide specific services (e.g., voice and data) to which the mobile device 102 can subscribe.

The mobile device 102 includes a host processor 108, a memory 206, a secure element 110, and a baseband component 210. These components work in conjunction to enable the mobile device 102 to provide useful features to a user of the mobile device 102, such as localized computing, location based services, and Internet connectivity. The secure element 110 can be configured to store one or more SIMs 114 (or eSIMs) for access to services of different MNOs 214 through the base stations 212. SIMs stored on the secure element 110 can be updated, modified, activated, deactivated, and/or deleted via communication between the secure element 110 of the mobile device 102 and applicable network equipment, such as the provisioning servers 216 (or other equivalent or similar network-based SIM management entities, such as an SM-DP). In some embodiments, SIMs 114 are pre-stored in the secure element 110 in an inactive state, and during a provisioning (or activation) process, the secure element 110 obtains MNO credentials (e.g., keys, etc.), service information (e.g., carrier information, services subscribed to), and/or other information, and uses this information to activate the SIM 114. It is noted that provisioning servers 216 can be maintained by a manufacturer of the mobile device 102, by the MNOs 214, by third party entities, or the like.

Figure 3:
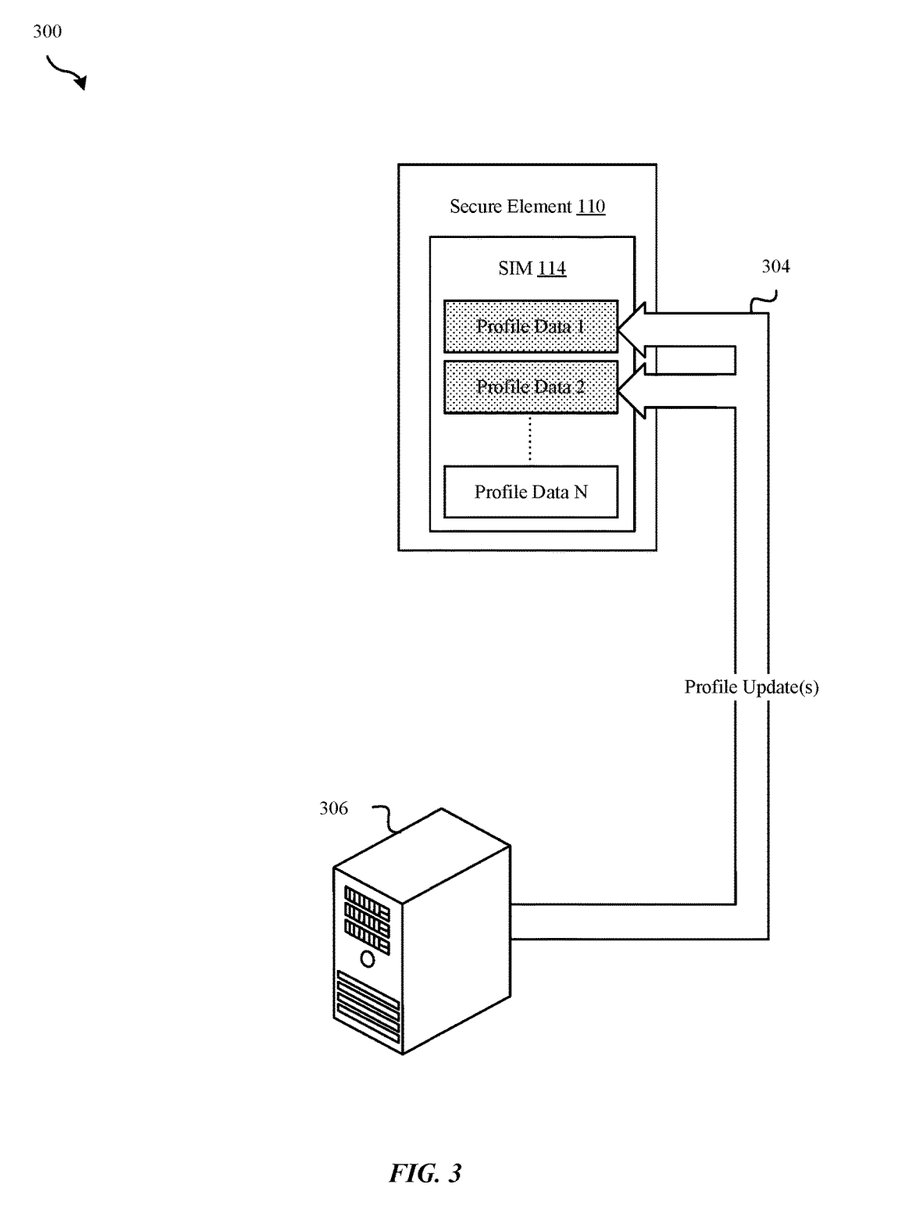
FIG. 3 illustrates a diagram of an example of an update for a subscriber identity module (SIM) of a secure element of a mobile device in communication with a network-based server, in accordance with some embodiments.

FIG. 3 illustrates a diagram 300 of an example of a profile update 304 for a subscriber identity module (SIM) 114 of a secure element 110 of a mobile device 102 in communication with a network-based server 306, in accordance with some embodiments. The profile update 304 of the SIM 114 may be associated with a method, or methods, that can be implemented by the execution of computer-executable instructions (e.g., computer program code) stored within a non-transitory computer-readable memory, such as the computer-executable instructions of the SIM manager 112 stored within the memory of the secure element 110 of the mobile device 102 and/or the computer-executable instructions stored within the memory of any of the SIM server(s) 106 depicted in FIG. 1.

In accordance with various embodiments, the term "profile," as used herein, may correspond to file structure data, application data, settings, policies (rule sets), etc., for a particular SIM 114 of the secure element 110, which are defined by a corresponding MNO that provisioned that SIM 114. As would be understood by those skilled in the field, various SIM profile data may need to be updated periodically by an MNO's SIM server 106 (e.g., in collaboration with an SIM manager 112) to ensure that corresponding access control procedures are properly supported by one or more provisioned SIM(s) of that MNO. Improperly configured SIM profile data can detrimentally result in network access and/or communication errors and failures at a mobile device 102, depending on the severity and type of SIM profile data defect(s) present within a secure element 110. Additionally, the SIM 114 may need initial activation and/or updating of SIM profile data during initial activation of the mobile device 102 and/or upon installation of the secure element 110 in the mobile device 102.

Figure 4:
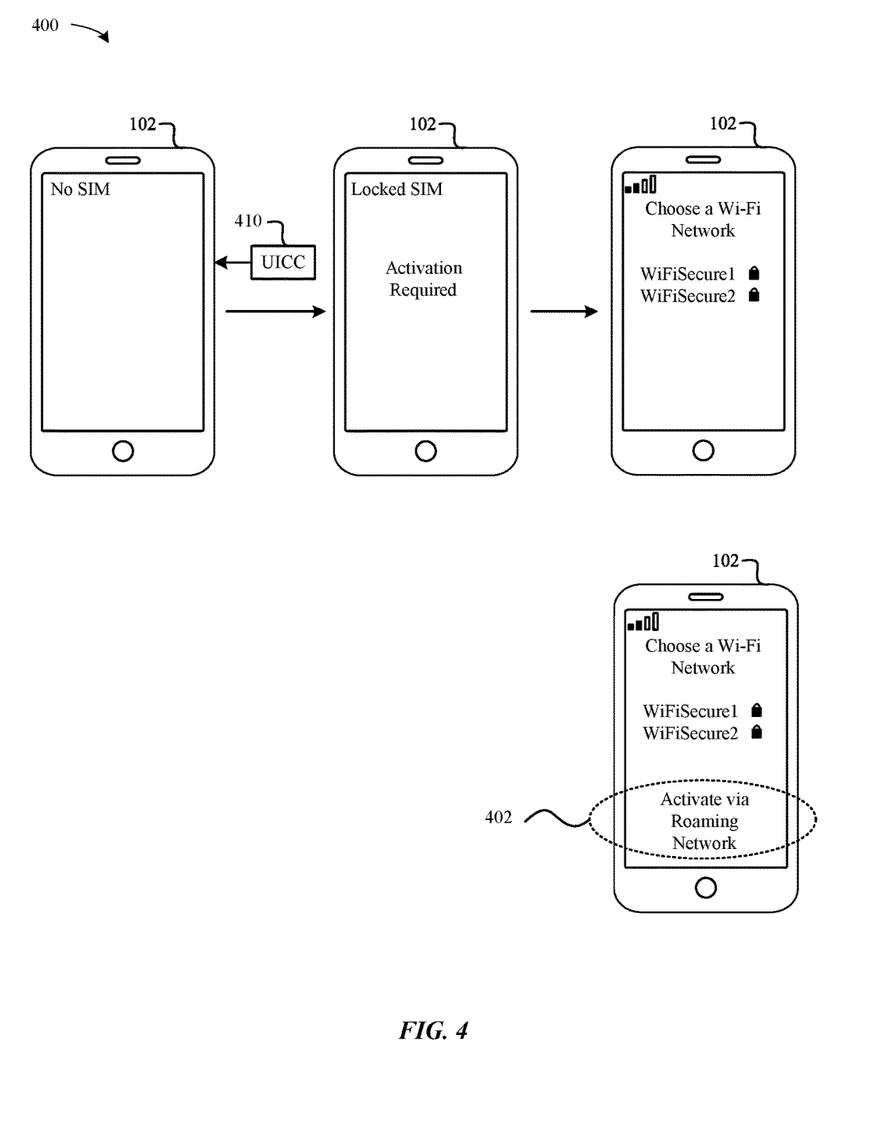
FIG. 4 illustrates an exemplary sequence for activation of a SIM by a mobile device, in accordance with some embodiments.

FIG. 4 illustrates a diagram 400 of an exemplary sequence for part of an activation of a SIM 114 by a mobile device 102, in accordance with some embodiments. Initially the mobile device 102 can include no active SIM 114, such as when there is no UICC 410 installed or no active eSIM on an eUICC of the mobile device 102, as shown by the "No SIM" indicator at the upper left corner of a display (which can also provide a user interface) of the mobile device 102. The UICC 410 can be an example of a secure element 110 as illustrated in FIGS. 1 to 3. After installation of the UICC 410, the mobile device 102 can indicate that the SIM 114 of the UICC 410 is not activated and can require activation through a data connection with a corresponding SIM server 106 of an MNO 214 associated with the SIM 114. When a cellular wireless network of the MNO 214 associated with the SIM 114 is not available for activation, the mobile device 102 can indicate that activation can be provided by an alternative wireless network, such as via a Wi-Fi network. When only secure Wi-Fi networks are available, which can require knowledge of a password, and the user is unable to establish a connection with a secure Wi-Fi network, the user may be unable to activate the SIM 114. A cellular wireless network that is not managed by the MNO 214 associated with the SIM 114 may be available, but the mobile device may be configured by default to not allow a roaming data connection to be established with non-local (roaming) cellular wireless networks. Moreover, the user may be unable to access a configuration setting, e.g., when initially activating a mobile device, to enable mobile data roaming in order to establish a connection to the corresponding SIM server 106 to activate the SIM 114. Without access via a non-roaming cellular wireless network or via another non-cellular wireless network, the user can be unable to establish the required connection for activation of the SIM 114. To remedy this defect, the mobile device 102 may provide an additional option for activation via a roaming cellular wireless network, e.g., as shown by the notification 402 on mobile device 102. Should the user accept this option for activation via a roaming cellular wireless network, activation of the SIM 114 can be realized by establishing a secure data connection through the roaming cellular wireless network between the UICC 410 of the mobile device 102 and an applicable corresponding network-based SIM server 106.

Figure 5:
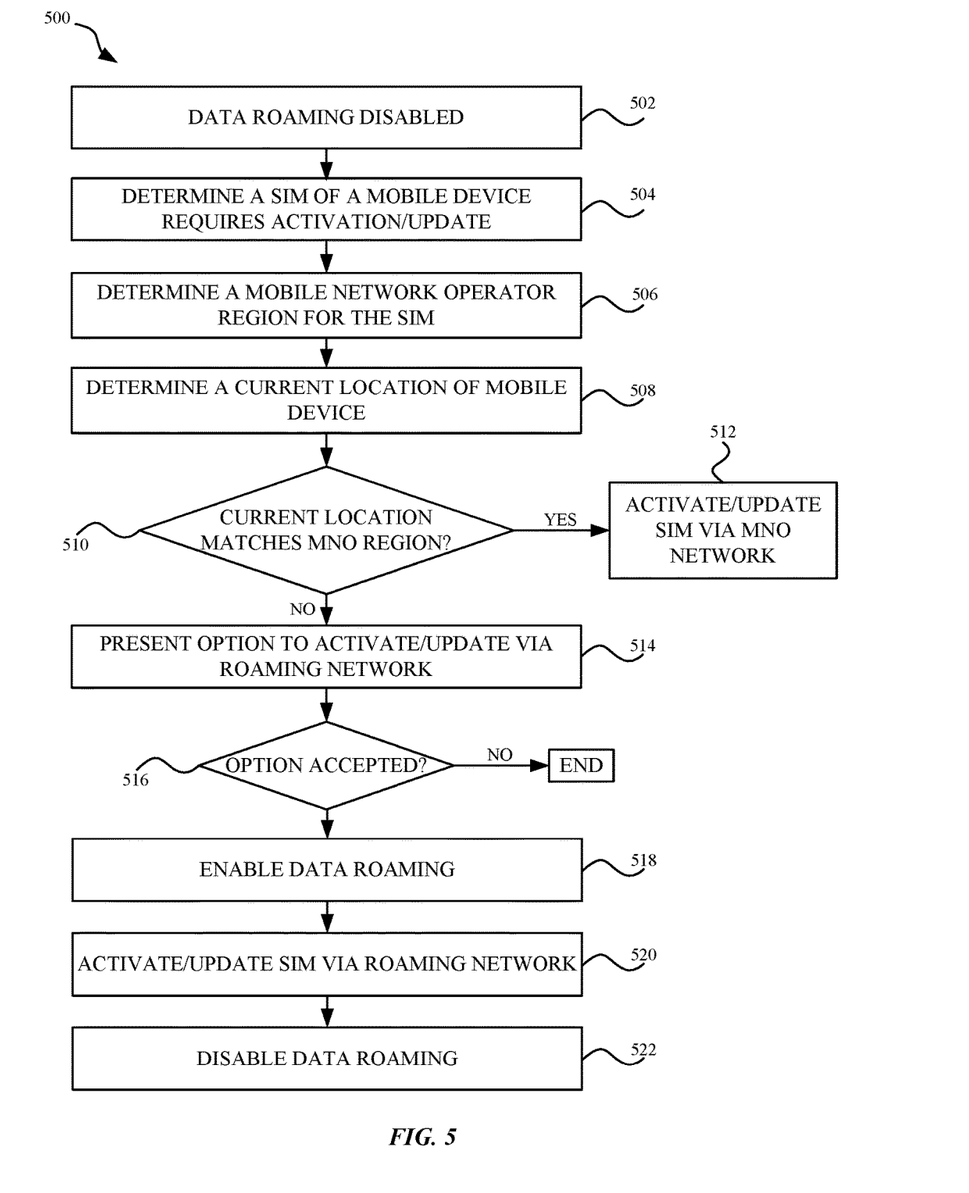
FIG. 5 illustrates a flow diagram of an example of a SIM update process by a mobile device in communication with a network-based server, in accordance with some embodiments.

FIG. 5 illustrates a flow diagram 500 of an example of an update process for a SIM 114 by a mobile device 102 in communication with a network-based SIM server 106, in accordance with some embodiments. At 502, a capability to establish data connections via roaming wireless networks can be disabled by default. Disablement of roaming data connections can occur upon initial activation of the mobile device 102, following an erase and new operating system (OS) installation of the mobile device 102, and/or when installation of a secure element 110, such as the UICC 410, which includes an inactive (yet to be activated) SIM 114 in the mobile device 102. At 504, the mobile device 102 can determine whether a SIM 114 of the mobile device 102 requires activation. At 506, the mobile device 102 can determine a region (or country of origin) for an MNO 214 associated with the SIM 114. At 508, the mobile device 102 determines a current geographic location of the mobile device 102. At 510, the mobile device 102 compares the current geographic location of the mobile device 102 to the region for the MNO 214 associated with the SIM 114 to be activated. When the current geographic location of the mobile device 102 matches the region associated with the SIM 114 to be activated, the mobile device 102, at 512, activates the SIM 114 through a secure data connection over a local cellular wireless network managed by the MNO 214. When the current geographic location of the mobile device 102 does not match the region associated with the SIM 114 to be activated, the mobile device 102, at 514, presents an option, e.g., via a user interface of the mobile device 102, to activate the SIM 114 via a roaming cellular wireless network. In some embodiments, the mobile device 102 advises whether roaming data charges may or may not occur as a result of activation of the SIM 114, e.g., for communication of data via the roaming cellular wireless network, which is not managed by the MNO 214 associated with the SIM 114, to the network-based SIM server 106. At 516, the mobile device 102 determines whether the option to activate via the roaming cellular wireless network is accepted. When not accepted, the process can end. Alternatively, the process can continue or also include other connectivity options presented via the user interface of the mobile device 102, such as to use a Wi-Fi network as shown in FIG. 4. When the option to activate via the roaming cellular wireless network is accepted, at 518, the mobile device 102 enables a data roaming capability for the SIM 114 to allow a secure data connection to be established through the roaming cellular wireless network to the network-based SIM server 106. At 520, the mobile device 102 performs an activation process to activate the SIM 114 (which can also or alternatively include update the SIM 114) using profile data obtained from the network-based SIM server 106. When activation (and/or updating) is complete for the SIM 114, the mobile device 102, at 522, disables the data roaming capability.

Enabling, on a temporary basis, of a data roaming capability of a mobile device 102 to allow for activation and/or updating of a SIM 114 of the mobile device 102 can be useful in multiple scenarios. For example, a user of the mobile device 102 can travel from a home region (or country of origin) in which the SIM 114 of the mobile device 102 can be used normally to a visited region (or visited country) in which cellular wireless networks of an MNO 214 associated with the SIM 114 of the mobile device 102 do not operate. While in the visited region, the user of the mobile device can access services by using a separate SIM 114 that is local to the visited region, such as by purchasing a local SIM card (e.g., a user-installable secure element 110 or UICC 410) to insert into the mobile device 102. The user can then replace the local SIM card with the original UICC that includes the SIM 114 for the home region. The mobile device 102 can determine that activation and/or updating of the SIM 114 for the home region needs to occur while the mobile device 102 is located in the visited region. The mobile device 102 can indicate to the user of the mobile device that activation (and/or updating) for the SIM 114 of the home region is required and provide options for connections that may include secure Wi-Fi networks. If the user has no access to passwords to establish connections with any of the secure Wi-Fi networks available, the user may be unable to activate (and/or update) the SIM 114 of the home region while in the visited region, unless a data roaming capability option is presented and allowed as discussed herein.

In another exemplary use case, the user can be locating in a visited region and perform an erase of a new installation of an operating system in the mobile device 102. In some circumstances, settings for a data roaming capability, which may previously have been enabled, may be disabled after the erasure, such as when reverting to default settings. Unless data roaming capability options are provided, the user may be unable to continue to use the mobile device 102 with the SIM 114 of the home region while the mobile device operates in the visited region when data roaming capabilities are disabled by default and no alternative access, such as through Wi-Fi networks are available for the user of the mobile device 102. Thus, as discussed herein, the mobile device 102 can detect a region for a SIM 114 to be activated or updated and compare the region for the SIM 114 with a current geographic location of the mobile device 102 to determine whether to present an option for data roaming to the user to allow for activation and/or updating of the SIM 114 while the mobile device 102 is operating in the current geographic location (which can be a visited region rather than a home region).

Figure 6:
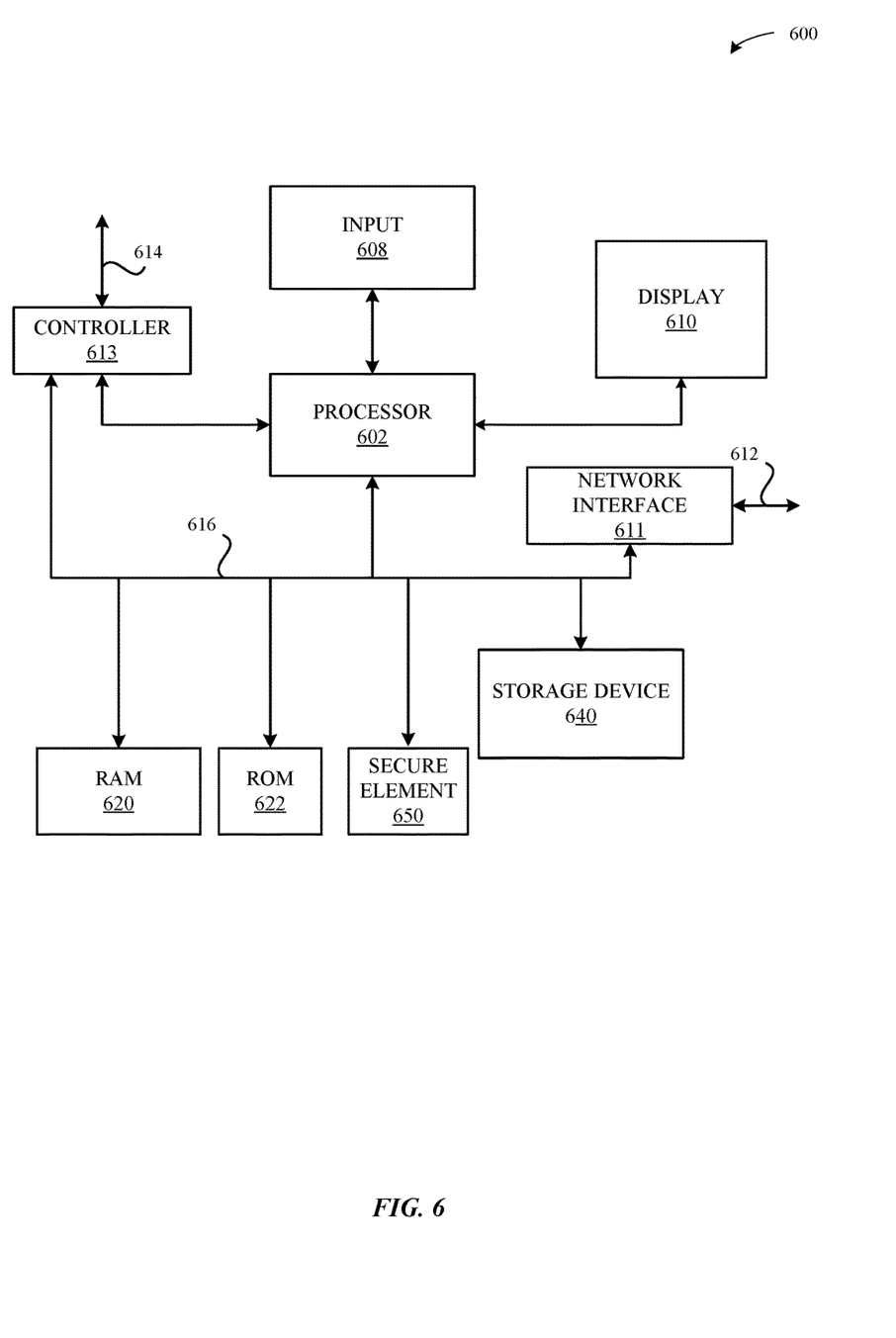
FIG. 6 illustrates a block diagram of exemplary components of a mobile device, in accordance with some embodiments.

FIG. 6 illustrates a block diagram 600 of exemplary components of a computing device (such as a mobile device 102), in accordance with some embodiments. The computing device can include a processor 602 that represents a microprocessor or controller for controlling the overall operation of the computing device. The computing device can also include a user input device 608 that allows a user of the computing device to interact with the computing device. For example, the user input device 608 can take a variety of forms, such as a button, keypad, dial, touch screen, audio input interface, visual/image capture input interface, input in the form of sensor data, etc. Still further, the computing device can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device can also include a network/bus interface 611 that couples to a data link 612. In the case of a wireless connection, the network/bus interface 611 can include a wireless transceiver.

The computing device also include a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device. The computing device can further include a secure element 650, which can represent the secure element 110 illustrated in FIGS. 1 to 3 and described in detail herein.

Representative Exemplary Embodiments

In some embodiments, a method for activation or update of a subscriber identity module (SIM) of a universal integrated circuit card (UICC) included in a mobile device includes processing circuitry of the mobile device external to the UICC: (i) determining the SIM requires activation or update; (ii) determining a geographic region for a mobile network operator (MNO) associated with the SIM; (iii) determining a current geographic location of the mobile device; and (iv) when the geographic region for the MNO associated with the SIM does not correspond to the current geographic location of the mobile device: (a) enabling a data roaming capability of the mobile device, (b) activating or updating the SIM via a local roaming cellular wireless network, and (c) disabling the data roaming capability after activation or update of the SIM.

In some embodiments, the method further includes the processing circuitry of the mobile device external to the UICC activating or updating the SIM via a local non-roaming cellular wireless network managed by the MNO, when the geographic region for the MNO associated with the SIM corresponds to the current geographic location of the mobile device. In some embodiments, the method further includes the processing circuitry of the mobile device external to the UICC: when the geographic region for the MNO associated with the SIM does not correspond to the current geographic location of the mobile device: presenting an option via a user interface of the mobile device to activate or update the SIM via the local roaming cellular wireless network, and enabling the data roaming capability in response to receipt of an indication to accept the presented option. In some embodiments, the determining the geographic region for the MNO associated with the SIM includes extracting information for a public land mobile network (PLMN) list included in the SIM. In some embodiments, the determining the current geographic location of the mobile device includes using a global positioning system (GPS) capability of the mobile device to determine the current geographic location. In some embodiments, the determining the current geographic location of the mobile device includes extracting a mobile country code (MCC) from signals received from a wireless network. In some embodiments, the activating or updating the SIM includes establishing a secure data connection between the UICC of the mobile device and a network-based server of the MNO via the local roaming cellular wireless network.

In some embodiments, a mobile device, configured to activate or update a subscriber identity module (SIM) of a universal integrated circuit card (UICC) included in the mobile device, includes processing circuitry external to the UICC and configured to: (i) determine the SIM requires activation or update; (ii) determine a geographic region for a mobile network operator (MNO) associated with the SIM; (iii) determine a current geographic location of the mobile device; and (iv) when the geographic region for the MNO associated with the SIM does not correspond to the current geographic location of the mobile device: (a) enable a data roaming capability of the mobile device, (b) activate or update the SIM via a local cellular wireless network, and (c) disable the data roaming capability after activation of the SIM.

In some embodiments, the processing circuitry of the mobile device is further configured to activate or update the SIM via a local non-roaming cellular wireless network managed by the MNO, when the geographic region for the MNO associated with the SIM corresponds to the current geographic location of the mobile device. In some embodiments, the processing circuitry of the mobile device is further configured to: when the geographic region for the MNO associated with the SIM does not correspond to the current geographic location of the mobile device: present an option via a user interface of the mobile device to activate or update the SIM via the local roaming cellular wireless network, and enable the data roaming capability in response to receipt of an indication to accept the presented option. In some embodiments, the mobile device determines the geographic region for the MNO associated with the SIM by at least extracting information for a public land mobile network (PLMN) list included in the SIM. In some embodiments, the mobile device determines the current geographic location of the mobile device by at least using a global positioning system (GPS) capability of the mobile device to determine the current geographic location. In some embodiments, the mobile device determines the current geographic location of the mobile device by at least extracting a mobile country code (MCC) from signals received from a wireless network. In some embodiments, the mobile device activates or updates the SIM by at least establishing a secure data connection between the UICC of the mobile device and a network-based server of the MNO via the local roaming cellular wireless network.

In some embodiments, an apparatus includes processing circuitry configured to activate or update a subscriber identity module (SIM) of a universal integrated circuit card (UICC) included in a mobile device by at least: (i) determining the SIM requires activation or update; (ii) determining a geographic region for a mobile network operator (MNO) associated with the SIM; (iii) determining a current geographic location of the mobile device; and (iv) when the geographic region for the MNO associated with the SIM does not correspond to the current geographic location of the mobile device: (a) enabling a data roaming capability of the mobile device, (b) activating or updating the SIM via a local roaming cellular wireless network, and (c) disabling the data roaming capability after activation or update of the SIM.

In some embodiments, the processing circuitry of the apparatus is further configured to activate or update the SIM of the UICC included in the mobile device by activating or updating the SIM via a local non-roaming cellular wireless network managed by the MNO, when the geographic region for the MNO associated with the SIM corresponds to the current geographic location of the mobile device. In some embodiments, the processing circuitry is further configured to activate or update the SIM of the UICC included in the mobile device by: when the geographic region for the MNO associated with the SIM does not correspond to the current geographic location of the mobile device: presenting an option via a user interface of the mobile device to activate or update the SIM via the local roaming cellular wireless network, and enabling the data roaming capability in response to receipt of an indication to accept the presented option. In some embodiments, the determining the geographic region for the MNO associated with the SIM includes extracting information from a public land mobile network (PLMN) list included in the SIM. In some embodiments, the determining the current geographic location of the mobile device includes using a global positioning system (GPS) capability of the mobile device to determine the current geographic location. In some embodiments, the activating or updating the SIM includes establishing a secure data connection between the UICC of the mobile device and a network-based server of the MNO via the local roaming cellular wireless network.

The various aspects, embodiments, implementations or features of the described embodiments can be used separately or in any combination. Various aspects of the described embodiments can be implemented by software, hardware, or a combination of hardware and software. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for activation of a subscriber identity module (SIM) of a universal integrated circuit card (UICC) included in a mobile device, the method comprising:
by processing circuitry of the mobile device external to the UICC:
determining the SIM requires activation;
determining a geographic region for a mobile network operator (MNO) associated with the SIM;
determining a current geographic location of the mobile device; and
when i) the geographic region for the MNO associated with the SIM does not correspond to the current geographic location of the mobile device and ii) a data roaming capability of the mobile device is not enabled:
enabling the data roaming capability of the mobile device;
activating the SIM via a secure data connection between the UICC of the mobile device and a network-based server of the MNO associated with the SIM through a local roaming cellular wireless network; and
disabling the data roaming capability after activation of the SIM, wherein the mobile device is configured by default to not allow a roaming data connection to be established.

2. The method of claim 1, further comprising:
when the geographic region for the MNO associated with the SIM corresponds to the current geographic location of the mobile device, activating the SIM via a local non-roaming cellular wireless network managed by the MNO.

3. The method of claim 1, further comprising:
when i) the geographic region for the MNO associated with the SIM does not correspond to the current geographic location of the mobile device and ii) the data roaming capability of the mobile device is not enabled:
presenting an option via a user interface of the mobile device to activate the SIM via the local roaming cellular wireless network; and
enabling the data roaming capability in response to receipt of an indication to accept the presented option.

4. The method of claim 1, wherein the determining the geographic region for the MNO associated with the SIM comprises extracting information from a public land mobile network (PLMN) list included in the SIM.

5. The method of claim 1, wherein the determining the current geographic location of the mobile device comprises using a global positioning system (GPS) capability of the mobile device to determine the current geographic location.

6. The method of claim 1, wherein the determining the current geographic location of the mobile device comprises extracting a mobile country code (MCC) from signals received from a wireless network.

7. The method of claim 1, wherein the activating the SIM comprises downloading profile data for the SIM from the network-based server of the MNO.

8. A mobile device configured to activate a subscriber identity module (SIM) of a universal integrated circuit card (UICC) included in the mobile device, the mobile device comprising processing circuitry external to the UICC and configured to:
determine the SIM requires activation;
determine a geographic region for a mobile network operator (MNO) associated with the SIM;
determine a current geographic location of the mobile device; and
when i) the geographic region for the MNO associated with the SIM does not correspond to the current geographic location of the mobile device and ii) a data roaming capability of the mobile device is not enabled:
enable the data roaming capability of the mobile device;
activate the SIM via a secure data connection between the UICC of the mobile device and a network-based server of the MNO associated with the SIM through a local roaming cellular wireless network; and
disable the data roaming capability after activation of the SIM,
wherein the mobile device is configured by default to not allow a roaming data connection to be established.

9. The mobile device of claim 8, wherein the processing circuitry is further configured to:
when the geographic region for the MNO associated with the SIM corresponds to the current geographic location of the mobile device, activate the SIM via a local non-roaming cellular wireless network managed by the MNO.

10. The mobile device of claim 8, wherein the processing circuitry is further configured to:
when i) the geographic region for the MNO associated with the SIM does not correspond to the current geographic location of the mobile device and ii) the data roaming capability of the mobile device is not enabled:
present an option via a user interface of the mobile device to activate the SIM via the local roaming cellular wireless network; and
enable the data roaming capability in response to receipt of an indication to accept the presented option.

11. The mobile device of claim 8, wherein the mobile device determines the geographic region for the MNO associated with the SIM by at least extracting information from a public land mobile network (PLMN) list included in the SIM.

12. The mobile device of claim 8, wherein the mobile device determines the current geographic location of the mobile device by at least using a global positioning system (GPS) capability of the mobile device to determine the current geographic location.

13. The mobile device of claim 8, wherein the mobile device determines the current geographic location of the mobile device by at least extracting a mobile country code (MCC) from signals received from a wireless network.

14. The mobile device of claim 8, wherein the activating the SIM comprises downloading profile data for the SIM from the network-based server of the MNO.

15. An apparatus comprising processing circuitry configured to activate a subscriber identity module (SIM) of a universal integrated circuit card (UICC) included in a mobile device by at least:
   determining the SIM requires activation;
   determining a geographic region for a mobile network operator (MNO) associated with the SIM;
   determining a current geographic location of the mobile device; and
   when i) the geographic region for the MNO associated with the SIM does not correspond to the current geographic location of the mobile device and ii) a data roaming capability of the mobile device is not enabled:
      enabling the data roaming capability of the mobile device;
      activating the SIM via a secure data connection between the UICC of the mobile device and a network-based server of the MNO associated with the SIM through a local roaming cellular wireless network; and
      disabling the data roaming capability after activation of the SIM, wherein the mobile device is configured by default to not allow a roaming data connection to be established.

16. The apparatus of claim 15, wherein the processing circuitry is further configured to activate the SIM of the UICC included in the mobile device by:
   when the geographic region for the MNO associated with the SIM corresponds to the current geographic location of the mobile device, activating the SIM via a local non-roaming cellular wireless network managed by the MNO.

17. The apparatus of claim 15, wherein the processing circuitry is further configured to activate the SIM of the UICC included in the mobile device by:
   when i) the geographic region for the MNO associated with the SIM does not correspond to the current geographic location of the mobile device and ii) the data roaming capability of the mobile device is not enabled:
      presenting an option via a user interface of the mobile device to activate the SIM via the local roaming cellular wireless network; and
      enabling the data roaming capability in response to receipt of an indication to accept the presented option.

18. The apparatus of claim 15, wherein the determining the geographic region for the MNO associated with the SIM comprises extracting information from a public land mobile network (PLMN) list included in the SIM.

19. The apparatus of claim 15, wherein the determining the current geographic location of the mobile device comprises using a global positioning system (GPS) capability of the mobile device to determine the current geographic location.

20. The apparatus of claim 15, wherein the activating the SIM comprises downloading profile data for the SIM from the network-based server of the MNO.

* * * * *